June 14, 1932.　　　J. ZIEDINS　　　1,863,133
MEASURING APPARATUS
Filed April 11, 1930　　4 Sheets-Sheet 1
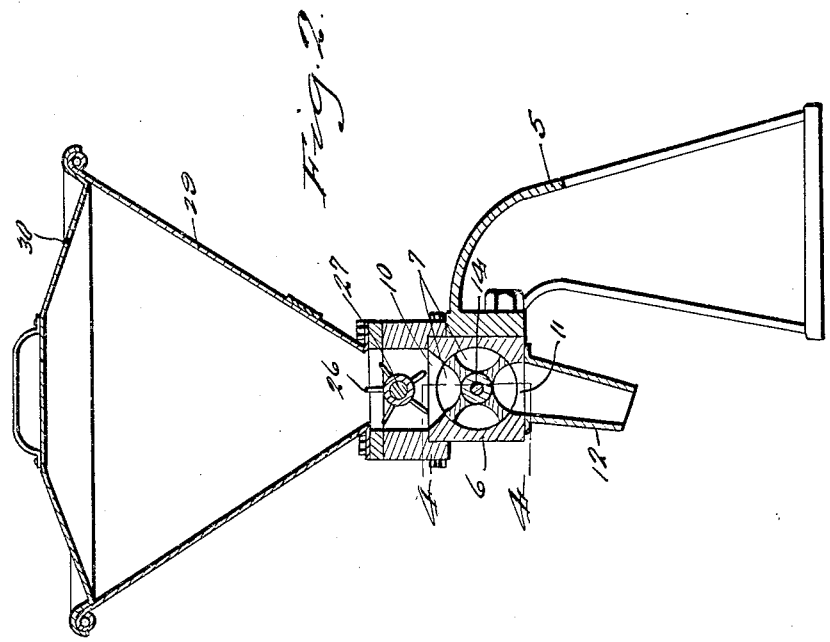
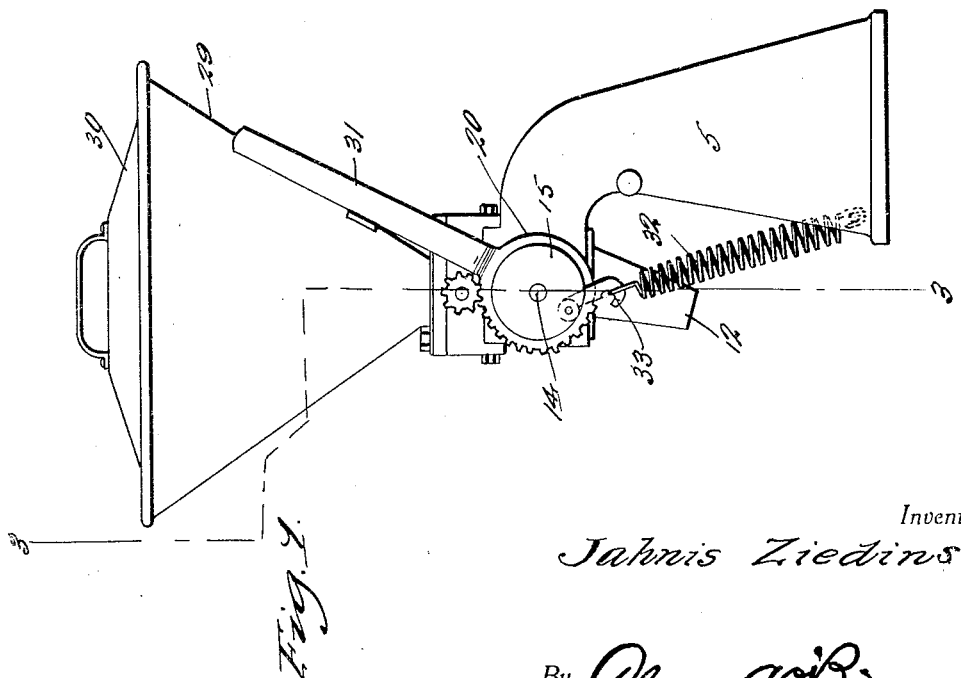
Inventor
Jahnis Ziedins
By Clarence A. O'Brien
Attorney

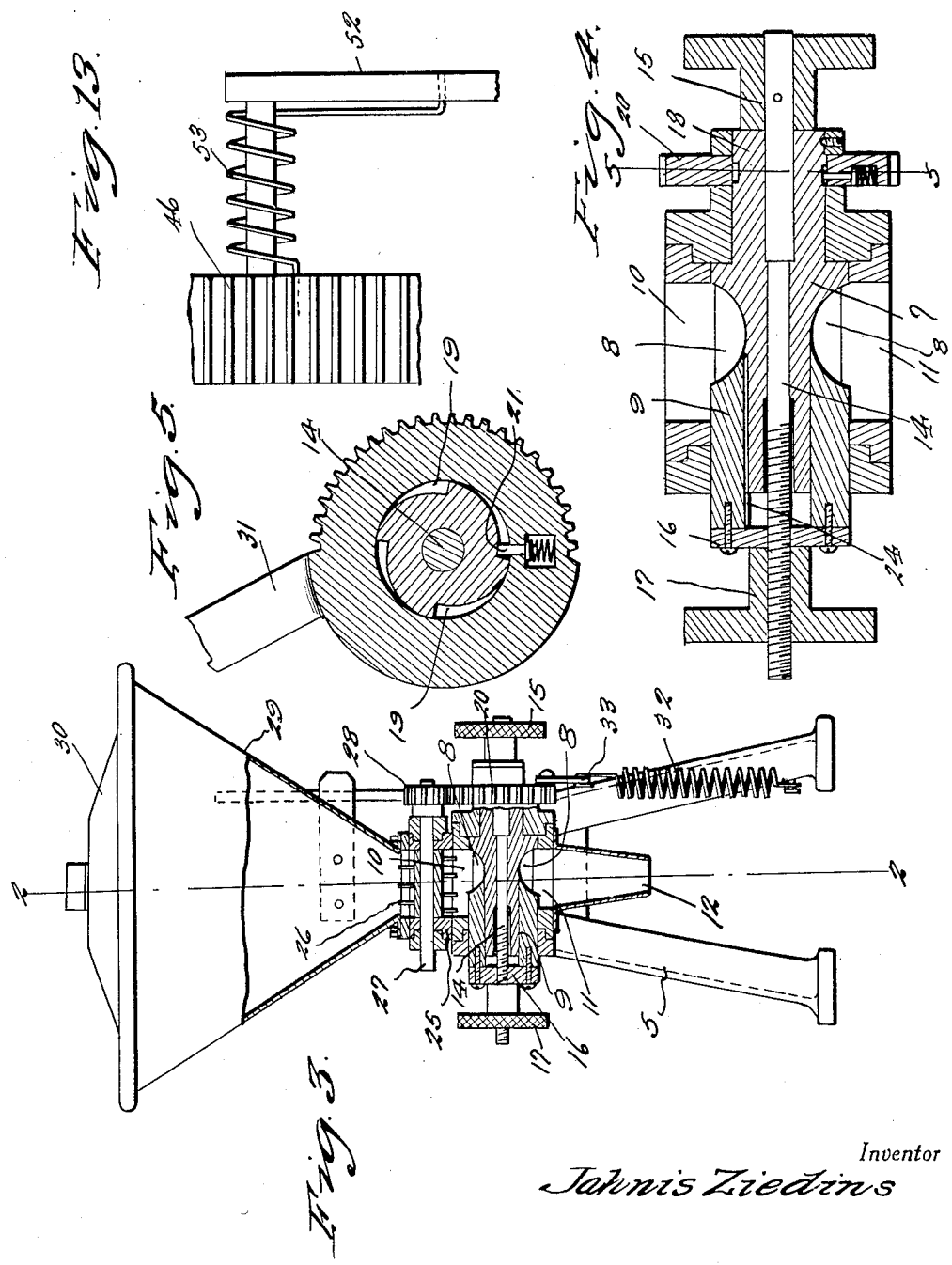

June 14, 1932.   J. ZIEDINS   1,863,133
MEASURING APPARATUS
Filed April 11, 1930   4 Sheets-Sheet 3
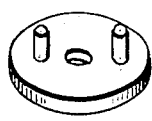
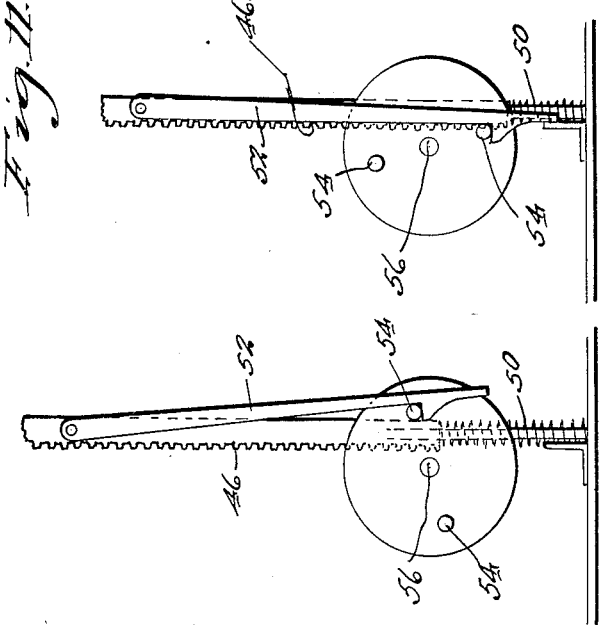
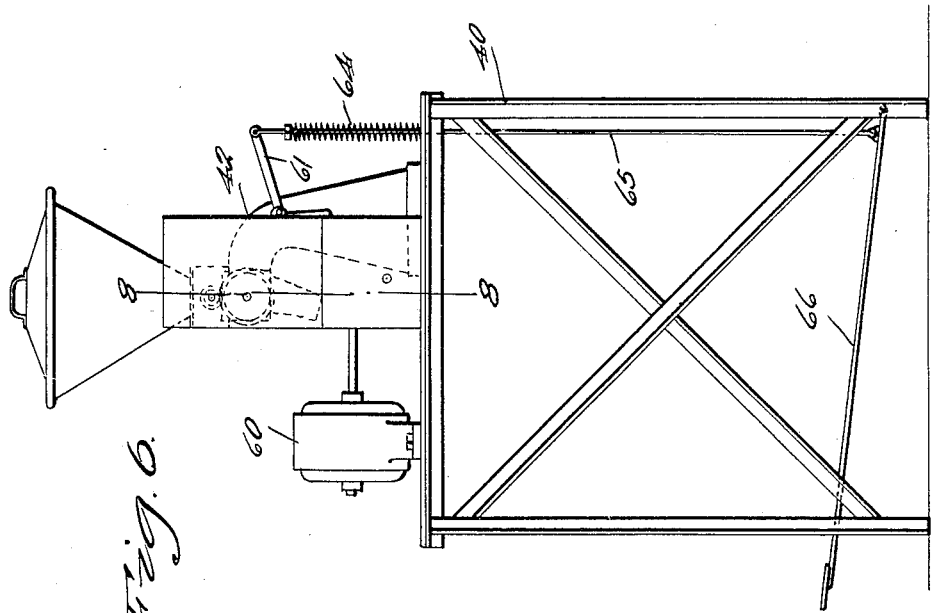
Inventor
Jahnis Ziedins
By Clarence A. O'Brien
Attorney

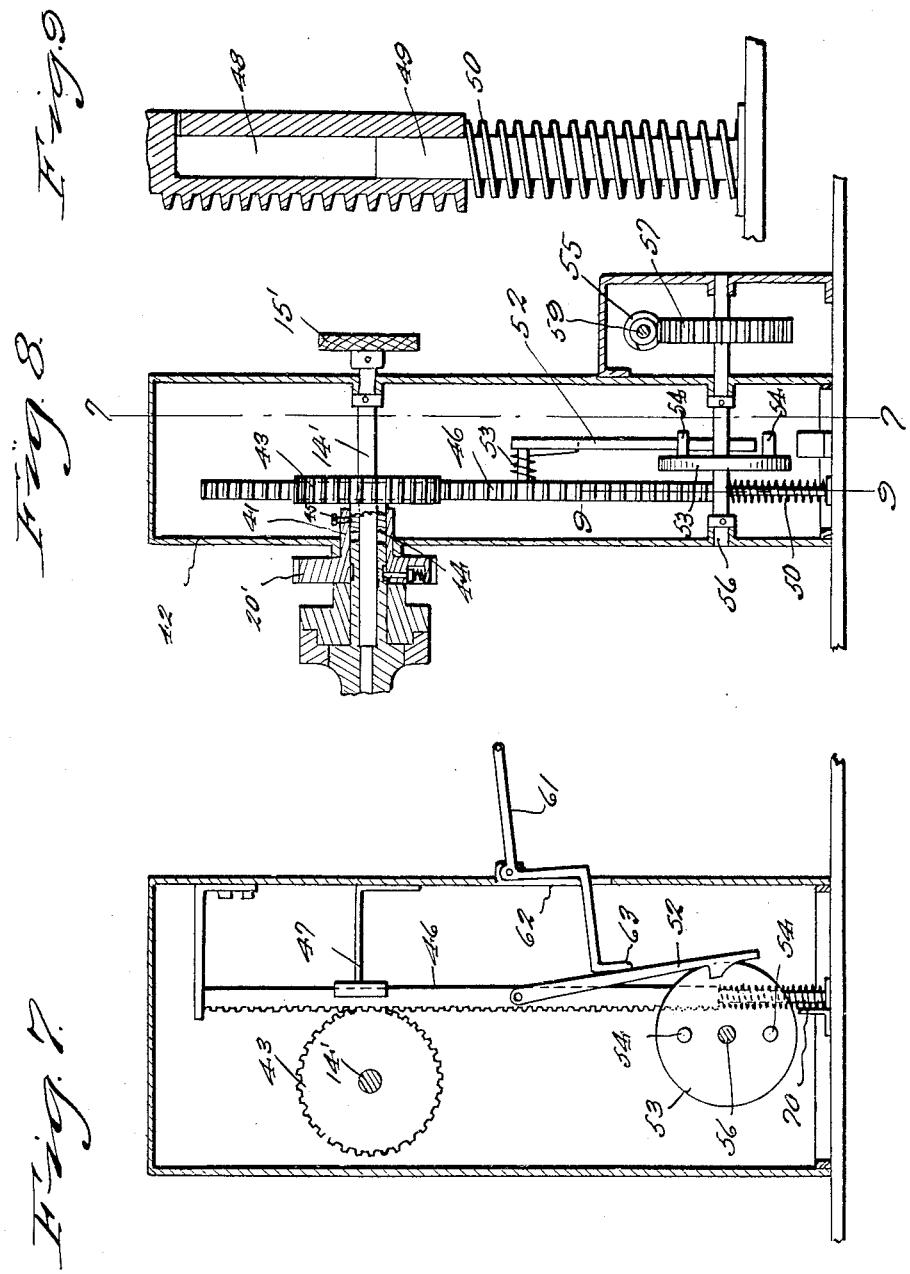

Patented June 14, 1932

1,863,133

UNITED STATES PATENT OFFICE

JAHNIS ZIEDINS, OF RIGA, LATVIA, ASSIGNOR TO OSCAR SCHENBERG, OF NEW YORK, N. Y.

MEASURING APPARATUS

Application filed April 11, 1930, Serial No. 443,447, and in Latvia April 22, 1929.

The present invention relates to an apparatus for measuring dry powder like substances and the prime object of the invention resides in the provision of an apparatus of this nature which may be adjusted depending upon the quantity of substance desired to be measured out.

Another very important object of the invention resides in the provision of an apparatus of this nature which is comparatively simple in construction, inexpensive to manufacture, easy to manipulate, thoroughly efficient and reliable in use and operation, and otherwise well adapted to the purpose for which it is designed.

With the above and numerous other objects in view as will appear as the description proceeds, the invention resides in certain novel features of construction, in the combination and arrangement of parts as will be hereinafter more fully described and claimed.

In the drawings:

Figure 1 is an elevation of a hand operated apparatus embodying the features of my invention, Figure 2 is a vertical section therethrough, taken substantially on the line 2—2 of Figure 3, Figure 3 is a sectional elevation taken substantially on the line 3—3 of Figure 1, Figure 4 is an enlarged detail section taken substantially on the line 4—4 of Figure 2, Figure 5 is a sectional view taken substantially on the line 5—5 of Figure 4, Figure 6 is an elevation of the apparatus of the powed operated type, Figure 7 is a vertical sectional view through the power transmitting mechanism taken substantially on the line 7—7 of Figure 8, Figure 8 is a similar section taken at right angles to that shown in Figure 7, Figure 9 is an enlarged detail section taken substantially on the line 9—9 of Figure 8, Figure 10 is a detail elevation of the rack and the disk in one position, Figure 11 is a similar view showing the parts in another position, Figure 12 is a perspective view of the disk, Figure 13 is a fragmentary elevation disclosing the spring for urging the catch in one direction.

Referring to the drawings in detail and particularly Figures 1 to 5 inclusive it will be seen that the numeral 5 denotes the stand supporting a casing 6 in which is rotatably mounted the measuring mechanism which comprises a section 7 having notches 8 therein and having one end slidable in the section 9.

When the section 9 is slid away from the section 7 the capacity of the notches is increased and vice versa. An inlet 10 is provided for the notches and an outlet 11 is provided. Funnel 12 is attached to the casing 6 leading downwardly from the outlet 11. A shaft 14 extends through the section 7 and has a knob 15 at one end for turning the same.

The other end is threaded through a disk 16 on the outer end of the section 9 so that obviously by turning the knob 15 the sections 7 and 9 may be moved for enlarging or increasing the size or capacity of the notches 8.

A lock nut 17 is engageable with the threaded end of the shaft 14. A portion 18 of the section 7 has ratchet teeth 19 formed thereabout. A gear segment 20 is rotatable about the hub and has a spring pressed pawl 21 engageable with the teeth 19 so that by oscillating this segment 20 intermittent rotary motion may be imparted to the sections 7 and 9.

It is to be noted that the sections 7 and 9 are splined together as is indicated at 24. A casing section 25 rises from the casing 6 communicating with the inlet 10 and an agitator 26 is mounted on a shaft 27 journaled across the section casing and having at one end a gear 28 meshing with the gear segment 20 so that when this gear segment 20 is oscillated the agitator is also oscillated so that the material in hopper 29 is fed downwardly.

This hopper is fixed on the casing 6 and has a suitable lid 30. A crank arm 31 projects from the gear segment for the purpose of oscillation thereof. A spring 32 is anchored on the bottom of the stand 5 and engaged with a hook 33 pivotally engaged on the gear segment diametrically opposite to the crank so that when the gear segment is oscillated in one direction by the crank it will be returned by the spring 32.

It will therefore be seen that as the intermittent motion is imparted to the rotary segment in the casing predetermined measurements of the material in the hopper 29 will be delivered to the funnel 12.

In Figures 6 to 13 inclusive I have illustrated another embodiment of the invention which is power operated. The numeral 40 denotes the table on which the apparatus is mounted. In this embodiment of the apparatus the gear segment 20' has a hub 41 journaled in an opening of a casing 42. A shaft 14' is extended clear through the casing and on its end there is mounted adjusting knob 15'.

A gear 43 is rotatable about the shaft 41' and has a hub extension 44 inside of the hub 41 and locked thereto by a set screw 45 or by any other suitable connection. A rack bar 46 is mounted for vertical movement in the casing, a suitable guide 47 being provided to hold this rack bar in mesh with the rack gear 43.

At the bottom end the rack bar is provided with a bore 48. A rod 49 rises from the bottom of the casing and extends in the bore functioning as a guide for the bottom end. A spring 50 disposed about the rod impinges upwardly against the bottom end of the rack bar normally holding the same in a raised position.

A catch 52 is swingably mounted on an intermediate portion of the rack bar 46 and has a spring 53 associated therewith for normally holding the same out of the path of movement of lugs 54 diametrically arranged on a disk 55 fixed on a shaft 56 which is journalled in the casing and has a spur gear 57 mounted thereon meshing with a worm 58 on a shaft 59 operatively connected with an electric motor 60 on the table or the like 40.

A lever 61 is rockably mounted on the casing extending through an opening 62 and has a shoe 63 for engaging the catch 52. A spring 64 is engaged with the outer end of the lever and has a rod or link 65 engaged therewith and actuatable by a treadle 66 so that by pressing down on the treadle 66, the lever 61 may be rocked to swing the catch into engagement with the lugs 54 so that as these lugs move about with the disk 55 they will jerk the rack bar downwardly and the catch is released when engaged with stop 70 and then the spring will push the rack bar up.

This vertical rectilinear movement of the rack bar imparts oscillatory movement to the rack gear 43 and through it oscillatory movement to the segment 20' for operating the apparatus as previously described in the manual control.

Obviously as soon as the foot is taken off the treadle the spring 64 moves the rod 65 upwardly and swings the lever to allow the spring 53 to swing the catch to an out of the way position.

It is thought that the construction, operation, utility and advantage of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It is apparent that changes in the details of construction, in the combination and arrangement of parts may be resorted to without departing from the spirit or scope of the invention as hereinafter claimed or sacrificing any of its advantages.

Having thus described my invention, what I claim as new is:

A measuring apparatus of the class described comprising a casing having a discharge opening therein and a rotatable measuring device controlling the opening, said device comprising an elongated section having a thickened part having grooves therein, the grooves being of arcuate shape in cross section, each arc being somewhat less than a semi-circle and the grooves passing through one end of the thickened portion, and a second section having fingers thereon shaped to fit the grooves, the inner ends of the fingers being grooved to form arcs of circles of the same radius as the grooves of the first section, but of slightly less arc, the juxtaposed ends of the grooves in the sections forming semi-spherical recesses for measuring purposes, and means for adjusting one section longitudinally on the other section to vary the size of the said recesses.

In testimony whereof I affix my signature.

JAHNIS ZIEDINS.